(12) United States Patent
Dakov et al.

(10) Patent No.: US 12,704,180 B2
(45) Date of Patent: Aug. 11, 2026

(54) SHAFT SEALING RING AND SHAFT ARRANGEMENT FOR HIGH ROTATIONAL SPEEDS

(71) Applicant: Trelleborg Sealing Solutions Germany GmbH, Stuttgart (DE)

(72) Inventors: Nino Dakov, Stuttgart (DE); Martin Franz, Wannweil (DE); Peter Bauer, Stuttgart (DE); Felix Schiefer, Stuttgart (DE)

(73) Assignee: Trelleborg Sealing Solutions Germany GmbH, Stuttgart (DE)

( * ) Notice: Subject to any disclaimer, the term of this patent is extended or adjusted under 35 U.S.C. 154(b) by 0 days.

(21) Appl. No.: 18/937,533

(22) Filed: Nov. 5, 2024

(65) Prior Publication Data

US 2025/0060037 A1 Feb. 20, 2025

Related U.S. Application Data

(63) Continuation of application No. PCT/EP2023/062487, filed on May 10, 2023.

(30) Foreign Application Priority Data

May 11, 2022 (DE) ..................... 10 2022 111 844.4

(51) Int. Cl.
*F16J 15/3244* (2016.01)
*F16J 15/3232* (2016.01)

(52) U.S. Cl.
CPC ....... *F16J 15/3244* (2013.01); *F16J 15/3232* (2013.01)

(58) Field of Classification Search
CPC .. F16J 15/3244; F16J 15/3232; F16J 15/3204; F16J 15/3208; F16J 15/3212
See application file for complete search history.

(56) References Cited

U.S. PATENT DOCUMENTS 2,643,147 A * 6/1953 Funkhouser ......... F16J 15/3232 277/560
4,118,856 A 10/1978 Bainard et al.
(Continued)

FOREIGN PATENT DOCUMENTS

CN 1112209 A 11/1995
CN 1477322 A 2/2004
(Continued)

*Primary Examiner* — Eugene G Byrd
(74) *Attorney, Agent, or Firm* — Orbit IP, LLP; Marc G. Martino

(57) ABSTRACT

A shaft sealing ring for sealing off a media side from an outer side of a shaft arrangement is disclosed. A sealing portion, in the operating state, extends along a sealing axis, and has a running surface for dynamic sealing contact with a sealing surface of a machine part of the shaft arrangement. The sealing portion is provided with a plurality of profile grooves, which are each laterally delimited by a first lateral flank, which is arranged on the media side during operational use of the shaft sealing ring. A second lateral flank is arranged on the ambient side during operational use. The profile grooves have a flow cross section with maxima and minima for a lubricating medium. Each minimum of the
(Continued)

flow cross section of a profile groove is arranged substantially in alignment with a maximum of the flow cross section of the respectively closest profile groove.

17 Claims, 9 Drawing Sheets

(56) References Cited

U.S. PATENT DOCUMENTS

| | | | | | |
|---|---|---|---|---|---|
| 4,886,281 | A * | 12/1989 | Ehrmann | F16J 15/3204 277/944 |
| 5,507,505 | A * | 4/1996 | von-Arndt | F16J 15/3236 277/560 |
| 5,615,894 | A * | 4/1997 | vom Schemm | F16J 15/3228 277/924 |
| 5,667,225 | A * | 9/1997 | Vollmer | F16J 15/3232 277/565 |
| 6,688,603 | B2 | 2/2004 | vom Schemm et al. | |
| 6,860,486 | B2 | 3/2005 | Hacker et al. | |
| 7,494,130 | B2 * | 2/2009 | Berdichevsky | F16J 15/3244 277/400 |
| 7,891,670 | B2 * | 2/2011 | Alajbegovic | F16J 15/3244 277/549 |
| 7,959,159 | B2 * | 6/2011 | Hocker | F02M 59/442 277/567 |
| 8,282,107 | B2 * | 10/2012 | Horiba | F16J 15/3216 277/564 |
| 8,800,996 | B2 * | 8/2014 | Sedlar | F16J 15/3224 277/568 |
| 8,925,927 | B2 * | 1/2015 | Berdichevsky | F16J 15/3244 277/309 |
| 10,655,735 | B2 * | 5/2020 | Franz | F16J 15/322 |
| 11,603,933 | B2 | 3/2023 | Wunder et al. | |
| 11,719,343 | B2 | 8/2023 | Wunder et al. | |
| 2004/0056427 | A1 | 3/2004 | Rapp et al. | |
| 2004/0227304 | A1 | 11/2004 | Kern et al. | |
| 2007/0187904 | A1 | 8/2007 | Berdichevsky | |
| 2014/0042709 | A1 * | 2/2014 | Sedlar | F16J 15/3224 277/552 |
| 2018/0266563 | A1 | 9/2018 | Kurth et al. | |

FOREIGN PATENT DOCUMENTS

| | | | | | |
|---|---|---|---|---|---|
| CN | 202125616 | U | | 1/2012 | |
| CN | 103697169 | A | | 4/2014 | |
| CN | 109958771 | A | | 7/2019 | |
| CN | 112747117 | A | | 5/2021 | |
| DE | 7016392 | U | | 7/1970 | |
| DE | 27 57 523 | A1 | | 6/1978 | |
| DE | 3316063 | C2 | * | 5/1983 | |
| DE | 101 09 320 | A1 | | 9/2002 | |
| DE | 101 54 789 | A1 | | 5/2003 | |
| DE | 103 13 162 | A1 | | 10/2004 | |
| DE | 10 2017 204 204 | A1 | | 9/2018 | |
| DE | 10 2017 012 166 | A1 | | 6/2019 | |
| DE | 10 2019 002 953 | A1 | | 10/2020 | |
| EP | 0 798 498 | A1 | | 10/1997 | |
| GB | 1 302 199 | A | | 1/1973 | |
| GB | 1 573 360 | A | | 8/1980 | |
| JP | 49-113956 | A | | 10/1974 | |
| JP | 50-039776 | B1 | | 12/1975 | |
| JP | 05-001071 | U | | 1/1993 | |
| JP | 2000337518 | A | * | 12/2000 | F16J 15/3244 |
| JP | 2001-295942 | A | | 10/2001 | |
| JP | 2003-035371 | A | | 2/2003 | |
| JP | 2005-273691 | A | | 10/2005 | |
| JP | 2008281192 | A | * | 11/2008 | F16J 15/3244 |
| JP | 3190389 | U | | 5/2014 | |
| JP | 2020-008096 | A | | 1/2020 | |
| WO | WO-0034694 | A2 | * | 6/2000 | F16J 15/3228 |

* cited by examiner

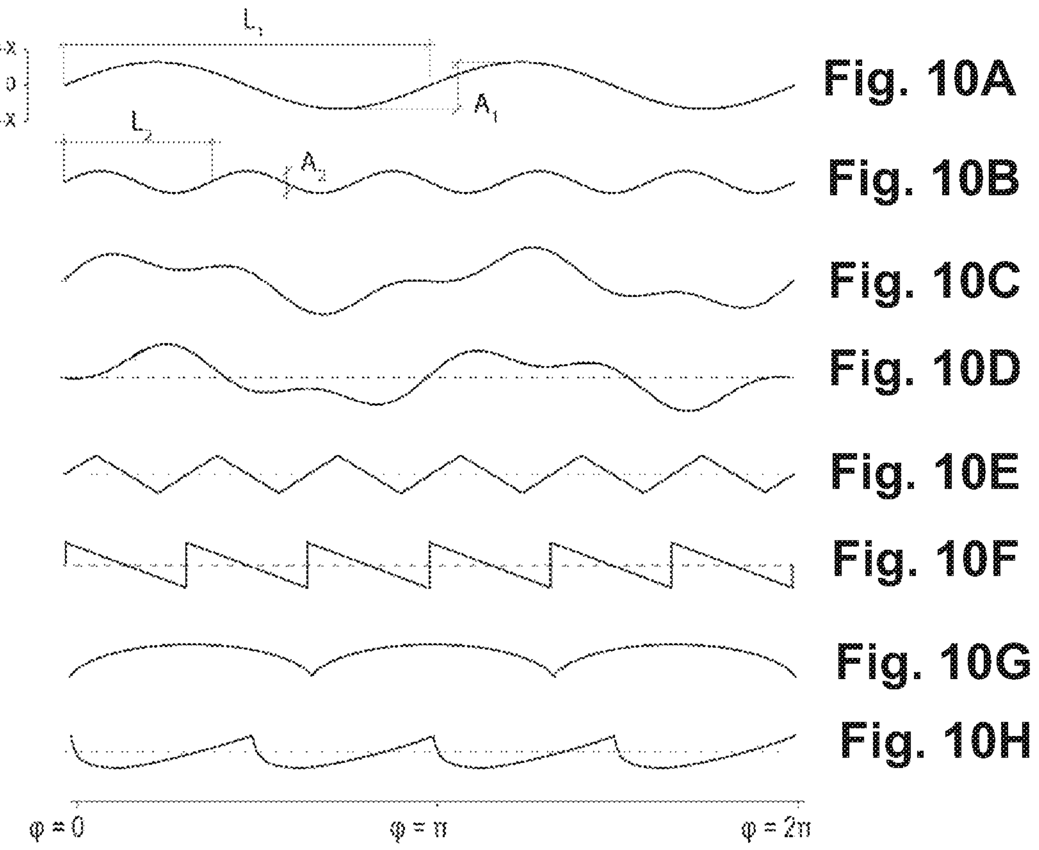
Fig. 10A
Fig. 10B
Fig. 10C
Fig. 10D
Fig. 10E
Fig. 10F
Fig. 10G
Fig. 10H
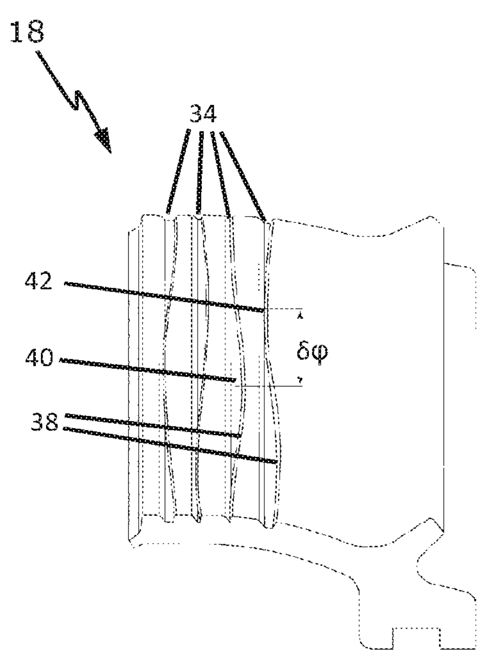
Fig. 11

SHAFT SEALING RING AND SHAFT ARRANGEMENT FOR HIGH ROTATIONAL SPEEDS

CROSS-REFERENCE TO RELATED APPLICATIONS

This continuation application claims priority to PCT/EP2023/062487 filed on May 10, 2023 which has published as WO 2023/217896 A1 and also the German application number DE 10 2022 111 844.4 filed on May 11, 2022, the entire contents of which are fully incorporated herein with these references.

DESCRIPTION

Field of the Invention

The invention relates to a shaft sealing ring and to a shaft arrangement for high rotational speeds.

Background of the Invention

Such a shaft sealing ring is known e.g. from DE 7016392 U.

Shaft arrangements are often used in practice for vehicle drives and in power tools, machine tools and the like. To seal off a sealing gap (=bearing gap) between the machine parts that can move relative to one another, one or more shaft sealing rings are generally used. The respective maximum permissible speed of revolution of the machine parts to be sealed off from one another by the shaft sealing ring depends inter alia on the material of the shaft sealing ring, the operating pressures to be sealed off and the type and scope of lubrication of the dynamic sealing portion of the shaft sealing ring. As is known, shaft sealing rings made of fluorocarbon elastomer material (FKM) can in principle be used at higher rotational speeds than, for instance, shaft sealing rings made of nitrile butadiene rubber (NBR).

For the sake of minimizing the thermal and mechanical stress on the shaft sealing ring, the aim in practice is to optimize lubrication in the region of the zone of contact of its dynamic sealing portion with the sealing or mating surface. One approach that is followed here is to provide the sealing portion of the shaft sealing ring or structures adjoining the latter with tribological micro- or macro-structures.

The shaft sealing ring known from DE 7016392 U comprises a circumferential sealing lip with a circumferentially extending sealing band between an inner and an outer frusto-conical surface which, when the seal is in operation, face towards and away from the liquid being sealed, respectively. The outer frustoconical surface is provided with guide surface portions each forming the surface of a rib or a groove which impinge obliquely on the sealing band. At least two of these guide surface portions each impinge on the sealing band in opposite circumferential directions at an angle of not more than 20° to the plane of the sealing band. The guide surface parts have two intersecting, oppositely directed groups of helical ribs which are formed on the outer frustoconical surface of the seal. The ribs of each group run parallel to one another and the helical angle, i.e., the angle at which the ribs meet the sealing band, is the same size and oppositely directed in both rib groups.

U.S. Pat. No. 4,118,856 A, for example, discloses providing the sealing portion with bidirectionally acting tribological structures in the form of rib- or web-type material projections that intersect one another. On account of their construction, however, tribological structures of this kind are often subject to considerable mechanical wear, especially in high-speed applications, and this is disadvantageous for the service life of the shaft sealing ring.

Profiling of the sealing portion of a shaft sealing ring, which is likewise somewhat unsuitable for high rotational speeds, is known from US20070187904 A1. Here, the sealing portion is provided with channels of uniform flow cross section that are parallel to one another or run obliquely relative to one another and intersect one another and are therefore fluidically connected and that, in some cases, end blind. Comparable profiling of the running surface of the sealing portion is known from DE 10109320 A1.

A radial shaft sealing ring, the sealing portion of which is provided, for the purpose of return delivery of media, with an annularly encircling groove, is disclosed in EP 0798498. On the base of the groove there is a hydrodynamically acting return delivery device, which projects radially inwards and is formed by an undulating structure running in the circumferential direction. The undulating structure has an internal profile that tapers in a wedge shape in the direction of the media side to be sealed off. This radial shaft sealing ring can be used in high-speed applications but, in the case of a relatively high contact pressure between the shaft sealing ring and the associated sealing surface, it has a very limited return delivery capacity, for example.

DE 10154789 A1 discloses another shaft sealing ring with a sealing lip that has a sealing portion for dynamically sealing contact with a sealing surface of a machine part. The sealing portion comprises a running surface having a plurality of profile grooves. The profile grooves are each embodied in such a way as to form a closed ring in the circumferential direction of the shaft sealing ring and are delimited in an axial direction with respect to the central axis of the shaft sealing ring by a first lateral flank arranged on the low-pressure side and a lateral flank arranged on the high-pressure or media side. That lateral flank of each profile groove which is arranged on the low-pressure side is of undulating design in the circumferential direction, while the high-pressure-side lateral flank of each profile groove can be embodied in such a way as to be straight, i.e., circular or, alternatively, undulating, in the circumferential direction. Admittedly, the profile grooves ensure, in high-speed applications, a reliable return delivery capacity for lubricating medium that has got into the profile grooves. Here too, however, the return delivery capacity of the shaft sealing ring is limited, especially when the operating pressures to be sealed off on the inner or media side of the sealing gap are high.

SUMMARY OF THE INVENTION

It is the object of the invention to specify a shaft sealing ring and a shaft arrangement comprising a shaft sealing ring which has an even further improved lubrication behavior and return delivery capacity and which allows an even further improved service life in the case of high rotational speeds, i.e., high-speed applications, and even at relatively high operating pressures that are to be sealed off.

The object relating to the shaft sealing ring is achieved by a shaft sealing ring having the features specified in claim 1. The shaft arrangement according to the invention has the features specified in claim 17. Preferred developments of the invention are specified in the dependent claims.

The shaft sealing ring according to the invention allows sealing off of an inner or media side that can be subjected as required to an operating pressure from an ambient or outer side of the sealing gap of a shaft arrangement. The shaft sealing ring has a sealing portion, which, in the assembled or operating state of the shaft sealing ring, extends along a sealing axis of the shaft sealing ring, and which has a running surface for dynamic sealing contact with the mating surface of a machine part of the shaft arrangement. The sealing portion comprises a running surface having a plurality of tribological macrostructures in the form of profile grooves. The profile grooves are each arranged on the sealing portion in a manner spaced apart in a direction that is axial with respect to the sealing axis of the shaft sealing ring and are open toward the dynamic running surface (=contact surface) of the sealing portion. Each profile groove is laterally delimited by a first channel wall or lateral flank, which is arranged on the media side during operational use of the shaft sealing ring, and by a second channel wall or lateral flank, which is arranged on the ambient side (=outer side or on the low-pressure side) during operational use. The first lateral flank has a straight or substantially straight course in the circumferential direction, i.e., is of circular design in relation to the sealing axis. The second lateral flank extends bidirectionally in the circumferential direction of the shaft sealing ring axially in the direction of the first lateral flank from each maximum of the flow cross section S of the profile groove to a minimum of the flow cross section. In other words, the second lateral flank is designed in such a way that the flow cross section decreases in sections and increases in sections in the circumferential direction. According to the invention, each minimum of the flow cross section of a profile groove is arranged in alignment or substantially in alignment in the axial direction with a maximum of the respectively closest profile groove, in particular the respectively closest profile groove on the media side.

In an alternative according to the invention, the groove depth of the profile groove or the flank course of a low-pressure-side groove flank of the profile groove which is directed toward the high-pressure side or the high-pressure-side groove flank varies in the circumferential direction of the profile groove, in particular periodically, in order to form alternate maxima and minima of the flow cross section in the profile groove. The low-pressure-side groove flank can run obliquely or in a rounded manner, for example.

By virtue of the fact that a minimum of the flow cross section of a profile groove is in each case in alignment in the axial direction with a maximum of the profile groove which is in each case arranged closest on the media side, a narrow running surface segment can in each case be arranged between these two portions. In corresponding fashion, a running surface segment that is wide (in the direction of the sealing axis) can be formed between the maximum of the flow cross section of a profile groove and the minimum of the flow cross section of the closest profile groove on the media side. During the operational use of the shaft sealing ring, return delivery of a lubricant axially towards the media or high-pressure side H can thereby be achieved with particularly low resistance and in an efficient manner, and thus particularly effective lubrication and cooling of the running surface of the sealing portion can be ensured. In other words, the return entrainment capacity of the shaft sealing ring is further improved. As a result, the shaft sealing ring is suitable especially for the high-speed applications mentioned at the outset.

It should furthermore be noted that a running surface portion of uniform or substantially uniform size for dynamically sealing contact between the sealing portion and the sealing or mating surface of the shaft arrangement can in this way be provided at each local cross section of the sealing portion over the circumference of the shaft sealing ring. This is advantageous for the static and for the dynamic sealing capacity of the shaft sealing ring, especially also in the case of relatively high media-side operating pressures of the lubricating medium to be sealed off, and for the life of the shaft sealing ring.

As a particular preference, the profile grooves are in the form of a closed ring in the circumferential direction of the shaft sealing ring. It is thereby possible to ensure lubrication and cooling of the running surface over the entire circumference. As a result, it is possible to counteract local excess mechanical/thermal stresses on the shaft sealing ring in a particularly reliable manner.

According to a further development of the invention, at least some of the profile grooves or, alternatively, all the profile grooves can be completely interrupted in the circumferential direction. It is thereby possible to enlarge the effective running surface of the shaft sealing ring even more, and this is advantageous especially for the sealing capacity of the shaft sealing ring.

As a very particular preference, each maximum of the flow cross section of the profile grooves is at least twice, preferably at least three times, very particularly preferably at least four times, as great as each minimum of the flow cross section. This is particularly advantageous during operational use for the lubricant absorption capacity of the respective profile groove and also the return pumping capacity (=return delivery capacity) of the shaft sealing ring. It is self-evident that, in the case where the profile grooves are completely interrupted in the circumferential direction, the minimum of the flow cross section is in each case zero at both ends of the profile groove.

According to a preferred embodiment of the shaft sealing ring, on both sides of each maximum of the flow cross section S of the respective profile groove, the second lateral flank of at least some or all of the profile grooves extends in each case in the form of a helix, i.e., with a constant gradient in the direction of the first lateral flank to the respective minimum of the flow cross section of the profile groove. Thus, on both sides of a maximum, the second lateral flank is of straight design to the respective minimum of the respective profile groove in a developed view.

According to an alternative embodiment, on both sides of each maximum of the flow cross section of the profile groove—in relation to the first lateral flank—the second lateral flank extends in a convexly curved or concavely curved manner towards the first lateral flank and to the respective minimum of the flow cross section of the profile groove. Thus, the second lateral flank has a non-constant gradient on both sides of a maximum and of the respective minima. The second lateral flanks are also curved in a developed view. By virtue of this embodiment, the course of the flow cross section of the profile groove(s) can be designed for the flow behavior of the lubricating medium and the relative speed of revolution of the machine parts to be sealed off in order to achieve an axial acceleration/a desired backpressure of the lubricant in the region of the minima of the profile grooves that is advantageous for the return delivery effect.

According to the invention, each profile groove can have a rounded or a polygonal cross-sectional shape or a hybrid form of these cross-sectional shapes. This enables the profile grooves to be matched in an optimum manner to the thickness of the sealing portion or of a sealing lip forming the sealing portion.

According to another embodiment of the invention, the first and/or the second lateral flank can have at least in sections different flank gradients in relation to the sealing axis of the shaft sealing ring. As a result, the local material weakening of the sealing portion by the profile groove can be minimized and, in the case of the second lateral flank, an even more powerful return delivery effect of the shaft sealing ring can be achieved.

The first lateral flank—arranged on the media side or high-pressure side—and the second lateral flank—arranged on the ambient side—of at least some of the profile grooves or of all the profile grooves can preferably converge towards the sealing axis in a radial direction. In other words, the profile grooves can taper in the direction of their radial depth extension. On the one hand, it is thereby possible to simplify axially directed return delivery of lubricants from one profile groove to the next. On the other hand, this offers advantages in terms of manufacturing in the case of a radial sealing ring designed as an injection molding, especially since, as a result, demolding of the radial sealing ring can be simplified and rejects can be avoided. It is thereby also possible to minimize weakening of the material of the shaft sealing ring in the region of the profile grooves.

In relation to the sealing axis, the profile grooves can have a radial depth which varies in the circumferential direction of the shaft sealing ring, in particular which is greater at a maximum of the flow cross section than at a minimum of the flow cross section of the respective profile groove. It is thereby possible to set the flow cross section of the profile grooves in a particularly efficient way, especially also in the case of shaft sealing rings of relatively small dimensions.

According to a further development of the invention, the axially directed return transport capacity of the shaft sealing ring can be increased even further by virtue of the fact that a running surface segment arranged between a minimum of a profile groove and the maximum of the respectively closest profile groove can be deformed in a radial and/or axial direction relative to the rest of the shaft sealing ring by actuating by the medium. It is thereby possible to minimize a mechanical flow resistance to the axially directed transfer of the lubricating medium from one profile groove to the profile groove which is arranged closest on the media side.

According to a particularly preferred embodiment of the invention, the sealing portion is formed by a sealing lip of the shaft sealing ring. The sealing lip preferably extends away from a holding portion of the shaft sealing ring and, in the installed state of the shaft sealing ring, is arranged so as to run parallel or substantially parallel to the sealing axis.

Depending on its envisaged area of application, the shaft sealing ring can comprise or consist of a material that is tough-elastic or rubber-elastic in deformation. It is self-evident that the shaft sealing ring can have a reinforcing insert (=reinforcement insert), which can preferably be embedded/arranged in or on the abovementioned holding portion of the shaft sealing ring.

According to the invention, the shaft sealing ring can be a radial shaft sealing ring or an axial shaft sealing ring. In the case of the radial shaft sealing ring, the sealing axis coincides with the central axis of the radial shaft sealing ring and, in the installed state, with the motion axis of the machine parts to be sealed off. In the case of the axial shaft sealing ring, the sealing surface/the sealing axis is arranged so as to run orthogonally with respect to the central axis of the axial shaft sealing ring.

The substantially straight course according to the invention of the first lateral flank preferably includes an axial modulation in the circumferential direction, the maximum amplitude of which is less than half the maximum amplitude of the second lateral flank, in particular less than one quarter of the maximum amplitude of the second lateral flank.

The substantially aligned arrangement according to the invention of a minimum of a profile groove with a maximum of the respectively closest profile groove preferably includes an offset in the circumferential direction of at most half of the angular spacing between a minimum and an adjacent maximum of a profile groove. The offset makes it possible to influence the character of the return delivery effect. As a particular preference, the offset in the circumferential direction amounts to about ¼ of the angular spacing between a minimum and an adjacent maximum of a profile groove.

For the case according to the invention where the groove depth of the profile groove or the flank course of a low-pressure-side groove flank of the profile groove which is directed towards the high-pressure side or the high-pressure-side groove flank varies periodically in the circumferential direction of the profile groove in order to form alternate maxima and minima of the flow cross section in the profile groove, the profile grooves can run in a straight line and parallel next to one another or in an undulating manner and parallel next to one another.

The shaft arrangement according to the invention comprises a first machine part in the form of a shaft and a second machine part surrounding the shaft. In particular, the second machine part can be a shaft housing. The shaft and the second machine part are arranged spaced apart, forming a sealing gap (=bearing gap), and can be adjusted relative to one another around an axis of rotation.

A shaft sealing ring is used to seal off a media/inner or high-pressure side H from an outer or low-pressure side N of the sealing gap or shaft arrangement, wherein the shaft sealing ring is designed in the manner explained above and rests by means of its sealing portion on a sealing or mating surface of one of the two machine parts with a dynamic sealing effect. In the case of an internally sealing shaft sealing ring, the sealing or mating surface is formed by the shaft and, in the case of an externally sealing shaft sealing ring, it is formed by the machine part that surrounds the shaft, i.e., is arranged on the outside in the radial direction. If the shaft and the machine part are moved relative to one another around the axis of rotation, a return delivery effect of the shaft sealing ring with respect to lubricant that has got onto the low-pressure side N or between the sealing portion and the sealing surface is thereby promoted. As a result of the relative rotary motion of the shaft and the machine part, the lubricant is forced in the circumferential direction along the profile groove into the constrictions of the respective profile groove and is conveyed axially through the low-pressure-side lateral flank of the profile grooves, which is curved towards the inner or media side, in the direction of the media side H, where it enters the widening of the flow cross section of the profile groove which is in each case arranged closest on the high-pressure side. This promotes the return pumping function of the shaft sealing ring axially in the direction of the inner or media side. It should be noted that, by virtue of the configuration of the profile grooves, the shaft sealing ring makes possible a return delivery function for a lubricant that is arranged in or has got into the profile grooves, independently of the direction of rotation.

It is self-evident that the dynamic sealing portion, that is to say, where present, the sealing lip, of the shaft sealing ring can be loaded against the sealing surface by means of a preloading element that can be deformed in a rubber-elastic manner.

Moreover, the shaft sealing ring can be arranged in an (assembly) cartridge, by means of which the shaft sealing ring can be provided and mounted in a holding structure of the machine part or shaft in a simpler manner and optionally with additional seal elements that are known per se.

The sealing lip of the shaft sealing ring rests by means of its running surface on the sealing surface in a dynamically and statically sealing manner, i.e., with profile grooves that are open toward the sealing surface.

The invention is explained in greater detail below by means of an exemplary embodiment depicted in the drawing. The embodiment shown and described should not be interpreted as a definitive enumeration but has much more of an illustrative character for the explanation of the invention.

BRIEF DESCRIPTION OF THE DRAWINGS

In the drawings:

FIGS. 10A-10H show various modulation variants of lateral flanks of the profile grooves of a shaft sealing ring;

FIG. 11 shows another shaft sealing ring in a detail view; and

DETAILED DESCRIPTION OF EMBODIMENTS OF THE INVENTION

Figure 1:
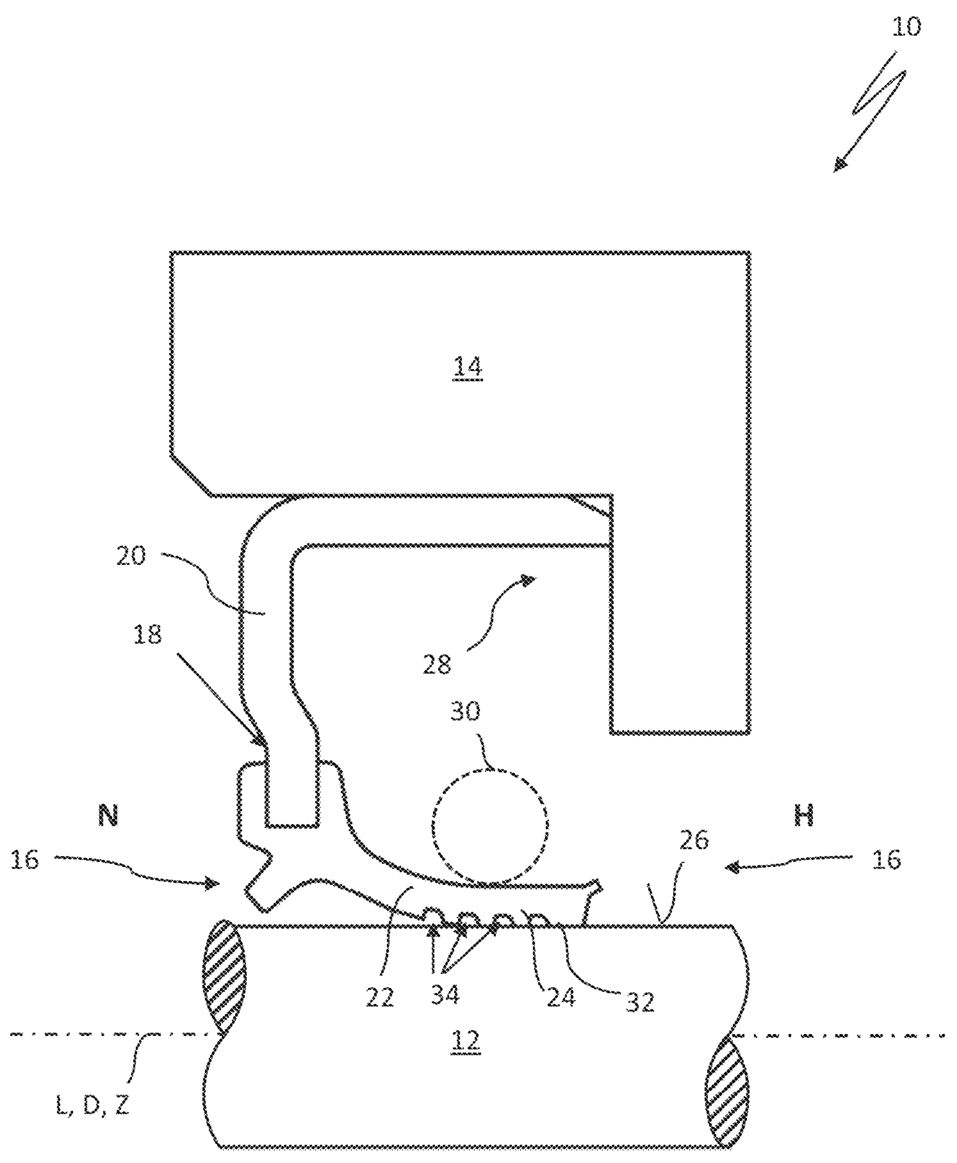
FIG. 1 shows a shaft arrangement comprising a shaft and a machine part surrounding the shaft and comprising a shaft sealing ring for sealing a bearing or sealing gap formed between the shaft and the machine part.

FIG. 1 shows a shaft arrangement 10 of the kind that can be used in many technical sectors, e.g. in drives for vehicles, machine tools, power tools or even pumps and compressors. The shaft arrangement 10 comprises a first machine part in the form of a shaft 12, and a second machine part 14, which surrounds the shaft 12 and, for example, can be embodied as a shaft housing, a mounting cartridge or the like. The shaft 12 and the machine part 14 are arranged spaced apart, forming a bearing or sealing gap 16, and can be adjusted relative to one another around an axis of rotation denoted by L.

A shaft sealing ring, denoted overall by 18, is used to seal off an internal or media side (or high-pressure side) H of the sealing gap 16 from an outer side N of the sealing gap 16. The shaft sealing ring 18 has a holding portion 20, a sealing lip 22 secured or molded on the holding portion 20, and a sealing portion 24 formed by the sealing lip 22. The sealing lip 22 can extend away from the holding portion 20 in a direction that is axial with respect to the central axis Z of the shaft sealing ring 18. In the assembled state shown, the central axis Z of the shaft sealing ring coincides with the axis of rotation L of the shaft arrangement 10. Here, the shaft sealing ring 18 rests by means of its sealing portion 24 on a mating or sealing surface 26 of the shaft 12 in a dynamic sealing manner. The holding portion 20 is arranged in a holding groove 28 of the machine part 14. The holding portion 20 of the shaft sealing ring 18 can consist of a different material from the sealing lip 22. The material of the holding portion 20 preferably has a higher modulus of elasticity than the material of the sealing lip 22. Thus, the holding portion 20 can comprise, for example, metal, a plastic, in particular a plastic that is tough-elastic in deformation, or a composite material, or can consist of one of these materials. It is self-evident that the shaft sealing ring can also be embodied in one piece, e.g. from tough-elastic plastic or an elastomer.

The shaft sealing ring 18 can be preloaded against the sealing surface 26 by means of an elastically deformable preloading element 30, e.g. in the form of a worm spring or of an elastomer ring, illustrated by a dashed line in FIG. 1.

In the assembled state shown, the sealing portion 24 extends along a sealing axis D of the shaft sealing ring 18. In the case of the shaft sealing ring, which here is embodied as a radial shaft sealing ring, the sealing axis D coincides with the central axis Z of the shaft sealing ring 18. If the shaft sealing ring 18 is embodied as an axial shaft sealing ring, the sealing surface and/or the sealing axis D are/is arranged orthogonally to the central axis Z of the shaft sealing ring and the motion axis L of the two machine parts 12, 14 in the assembled state.

According to FIG. 1, the sealing portion 24 comprises a running surface 32 and a plurality of profile grooves 34 arranged in the running surface 32. The profile grooves 34 serve as tribological structures and, in the assembled state, are arranged spaced apart in a direction that is axial with respect to the sealing axis D. It should be noted that each profile groove 34 is embodied in such a way as to be open toward the dynamic running surface 32 of the sealing portion 24 and thus, in the assembled state, in a radial direction toward the sealing surface 26 of the shaft 12.

Figure 2:
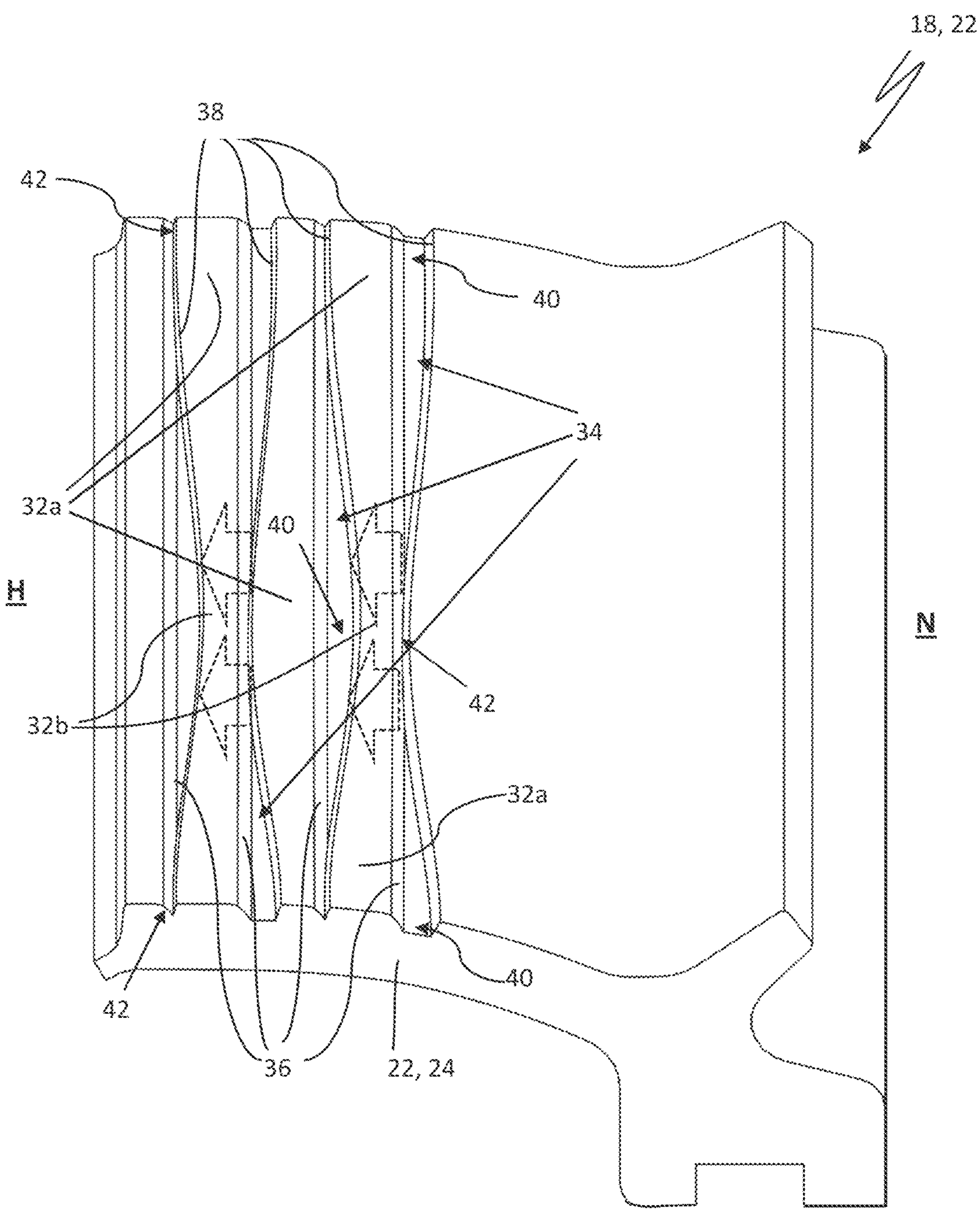
FIG. 2 shows the sealing portion of the shaft sealing ring according to FIG. 1 in a detail view illustrating the profile grooves on the running surface.

FIG. 2 shows the sealing portion 24 of the shaft sealing ring 18 according to FIG. 1 in a perspective detail view.

During the operational use of the shaft sealing ring 18, the profile grooves 34 are each delimited laterally in an axial direction by a first channel wall/lateral flank 36, which is arranged on the media or high-pressure side H, i.e., is on the high-pressure side, and by a second channel wall/lateral flank 38, which is arranged on the outer side N, i.e., is on the low-pressure side. On both sides in the axial direction, the profile grooves 34 are each embodied in such a way as to be closed all the way round in a ring shape. In other words, the profile grooves 34 do not have any fluid connecting channels or the like between them.

The high-pressure-side first lateral flank 36 of each of the profile grooves 34 has a straight or substantially straight course in the circumferential direction. In contrast, that lateral flank 38 of each profile groove 34 which is arranged on the low-pressure side has an undulating profile in the circumferential direction of the shaft sealing ring 18. As a result, each profile groove 34 has maxima 40 and minima 42 of its free (=clear) flow cross section for a lubricant used to lubricate the contact zone between the sealing portion 24 and the sealing surface 26, said maxima and minima alternating in the circumferential direction.

Each maximum 40 of the flow cross section of the profile grooves 34 can be at least three times, in particular at least four times, the minima 42 of the flow cross section S.

The second low-pressure-side lateral flanks 38 extend axially on both sides from each maximum 40 in the direction of the closest minimum 42, with a concave curvature with respect to the first lateral flank 36. Here, the second (low-pressure-side) lateral flanks 38 are embodied in such a way as to have an undulating shape overall in the circumferential direction.

The maxima 40 and the minima 42 of the flow cross sections S of two profile grooves 34 that immediately follow one another in the axial direction are each arranged offset in such a way with respect to one another in the circumferential direction that each constriction 42 of a profile groove 34 is in alignment or substantially in alignment axially in the direction of the media or high-pressure side H with a maximum 40 of the profile groove 34 arranged closest in each case. In corresponding fashion, each maximum 40 of the flow cross section S of a profile groove 34 is arranged in alignment or substantially in alignment in the axial direction toward the media or high-pressure side H with a minimum 42 of the profile groove 34 arranged closest in each case. As a result, axially in the direction of the media or high-pressure side H, maxima 40 of a profile groove 34 in each case adjoin a wide running surface segment 32*a*, and constrictions 42 of a profile groove 34 correspondingly each adjoin a narrow running surface segment 32*b* of the running surface 32 of the sealing portion 24.

It should be noted that a running surface portion of uniform or substantially uniform size for dynamically sealing contact between the sealing portion and the sealing or mating surface of the shaft 12 or machine part 14 of a shaft arrangement 10 is in this way ensured at each local cross section of the sealing portion over the circumference of the shaft sealing ring 18. This is advantageous for the sealing capacity of the shaft sealing ring 18.

If the shaft 12 and the machine part 14 are moved relative to one another around the axis of rotation L, a return delivery effect of the shaft sealing ring 18 with respect to lubricating medium that has got onto the low-pressure side N or between the sealing portion 24 and the sealing surface 26 is thereby promoted. As a result of the relative rotary motion of the shaft 12 and the machine part 14 and independently of the direction of rotation, the lubricating medium is forced in the circumferential direction along the profile groove 34 toward a minimum 42 of the flow cross section S of the respective profile groove 34. While impinging on the second lateral flanks 38, which are bent/curved axially in the direction of the inner or media side H, the lubricating medium is accelerated/conveyed against the sealing surface and, in accordance with the arrows A, axially in the direction of the high-pressure region H, and thus enters the closest profile groove 34 on the media side in the region of the maximum 40 of its flow cross section S. This promotes the return pumping function of the shaft sealing ring 18 axially in the direction of the media or high-pressure side H. It should be noted that, by virtue of the shaping of the profile grooves 34, the shaft sealing ring 18 makes possible a return delivery function for lubricating medium arranged in the profile grooves 34, independently of the direction of rotation.

In particular, the shaft sealing ring 18 or sealing lip 22 of the shaft sealing ring 18 can comprise or be formed by an elastomer material that is rubber- or tough-elastic in deformation, e.g. PTFE (polytetrafluoroethylene).

Figure 3:
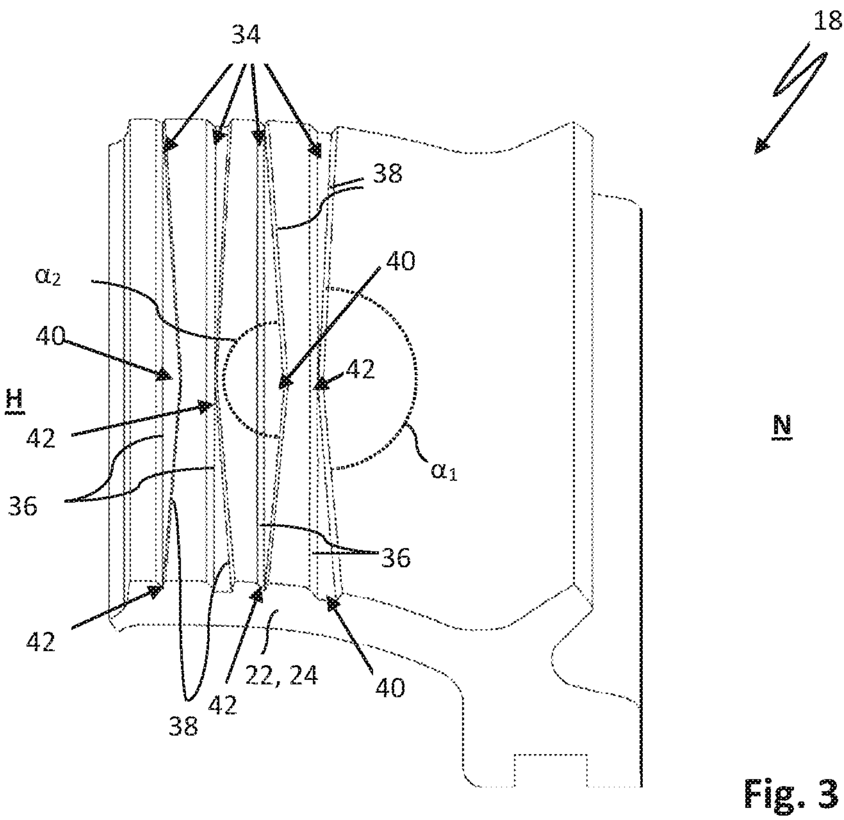
FIG. 3 shows another shaft sealing ring in a detail view.

FIG. 3 shows another exemplary embodiment of a radial shaft sealing ring 18. Here too, the profile grooves 34 are in the shape of a ring that runs all the way round on the sealing portion 24, and they do not have any interruptions. In contrast to the exemplary embodiment shown in FIG. 2, the second lateral flanks 38 of the profile grooves 34 do not have an undulating course. On the contrary, the second lateral flanks 38 extend in a straight line from each maximum 40 of the flow cross section of a profile groove 34 on both sides to the two minima 42 of the flow cross section S of the respective profile groove 34 which are arranged closest in each case. In the region of each minimum 42 and of each maximum 40, the second lateral flanks 38 each form an obtuse angle $\alpha_1$, $\alpha_2$.

The second lateral flanks 38 of the profile grooves 34 can also each be shaped so as to run in a curve from each maximum 40 of the flow cross section of the respective profile groove 34 to the two closest minima 42 of the flow cross section of the profile groove 34.

Figure 4:
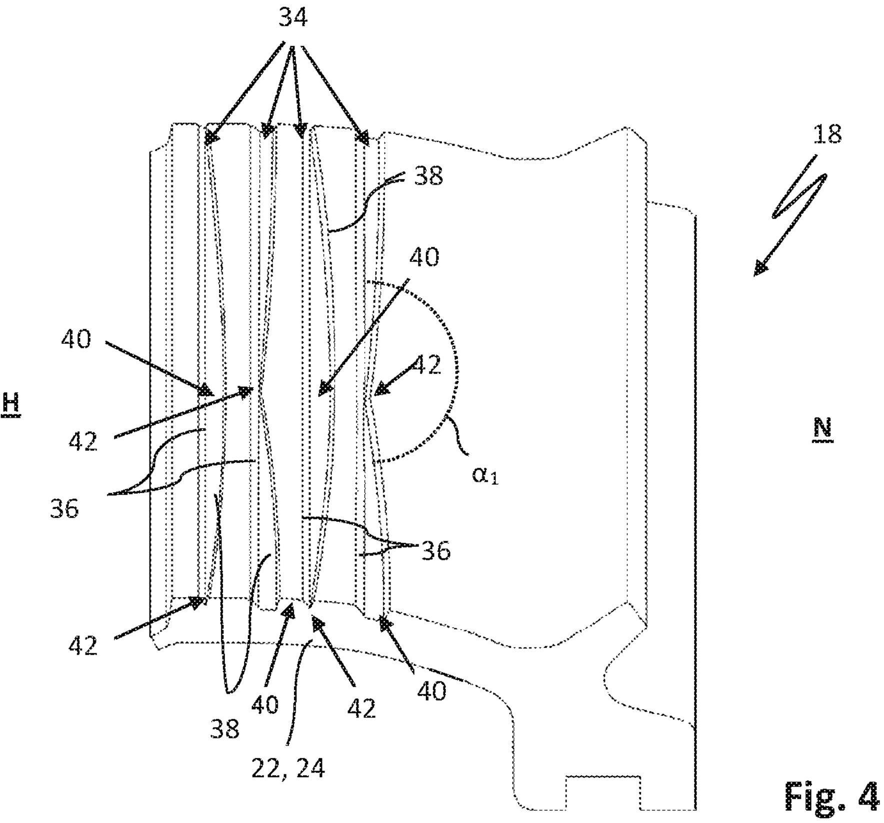
FIG. 4 shows another shaft sealing ring in a detail view.
Figures 5, 6:
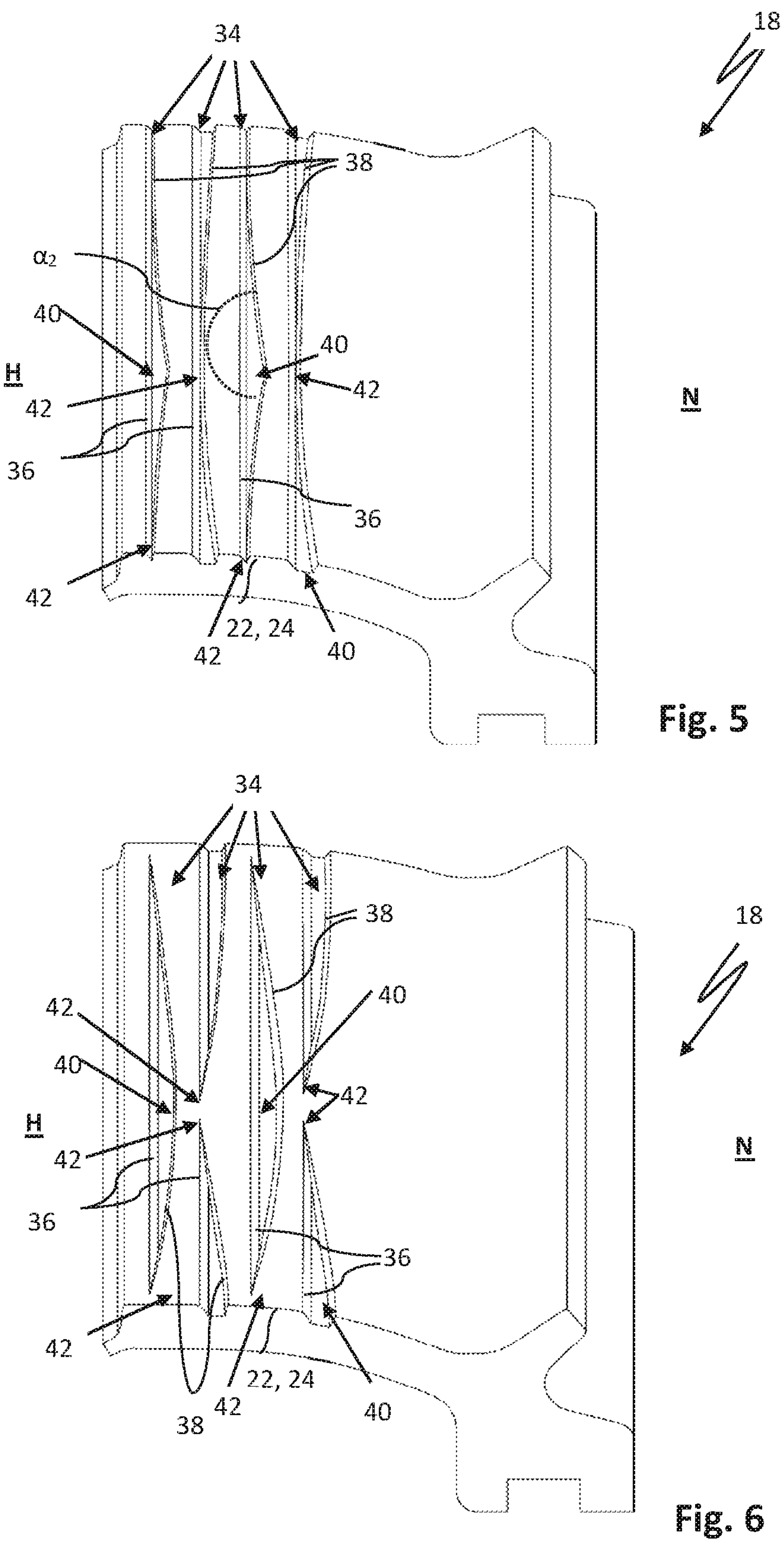
FIG. 5 shows another shaft sealing ring in a detail view.
FIG. 6 shows another shaft sealing ring in a detail view.

In the exemplary embodiment shown in FIG. 4, the second lateral flanks 38 each have a concave course in relation to the first lateral flank 36 and, according to the exemplary embodiment shown in FIG. 5, they have a convex course in relation to the first lateral flank 36 of the profile groove 34. In the region of the minima 42 of the flow cross section of the respective profile groove 34, the second lateral flank 38 is embodied so as to run in an arc shape. By means of a curved course, increased acceleration of the lubricating medium in the direction of the respective minimum/the media side H can be achieved during operational use, depending on the direction of rotation of the shaft 12 and of the machine part 14 (FIG. 1). It is thereby possible to further increase the return delivery capacity of the shaft sealing ring 18 if required.

FIG. 6 shows a detail view of another embodiment of a shaft sealing ring 18. Here, the profile grooves 34 are each completely interrupted or segmented in the circumferential direction of the shaft sealing ring 18. Here too, the second lateral flanks 38 extend from each maximum 40 of the flow cross section of the respective profile groove 34 on both sides to the closest minimum 42 of the flow cross section. The flow cross section is zero at each minimum 42. In an axial direction with respect to the sealing axis D (FIG. 1), the minima 42 of the profile grooves 34 are substantially in alignment with a maximum 40 of the flow cross section of the profile groove 34 which is closest in the direction of the media side. In a manner corresponding to FIG. 3, the second lateral flanks 38 of the profile grooves 34 can also extend in a straight line or with a convex curvature to the two minima 42 of the flow cross section S of the respective profile groove 34 which are arranged closest in each case.

It should be noted that the profile grooves 34 of the shaft sealing ring 18 can have different geometries of their flow cross section S, and further details of this will be given below with reference to FIG. 7.

Instead of running in a plane at right angles to the central axis Z, as in FIGS. 2-6, the profile grooves 34 can also run obliquely or in a manner tilted with respect to the central axis Z.

Figure 7A:
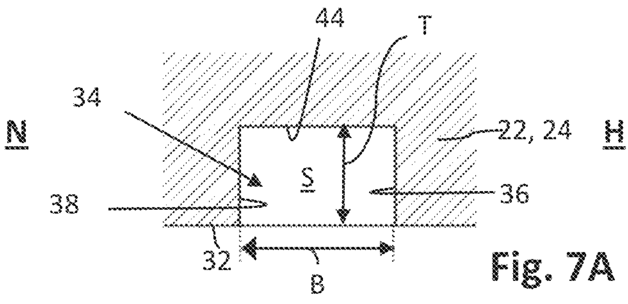
FIGS. 7A-7J show profile grooves of a shaft sealing ring with different geometries of their flow cross section.

FIG. 7A shows a detail view of a rectangularly shaped profile groove 34 of a sealing portion 22 of a shaft sealing ring 18. The first and the second lateral flank 36, 38 are embodied so as to run parallel to one another, and they are arranged so as to run orthogonally with respect to the sealing axis D in the installed state of the shaft sealing ring 18. The profile groove 34 has a bottom segment 44, which is arranged so as to run parallel to the sealing axis D. The depth of the profile groove 34 is denoted by T. The width of the profile groove is denoted by B.

Figure 7B:
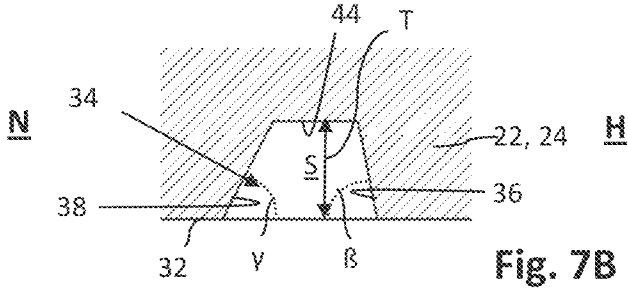
Figure 7C:
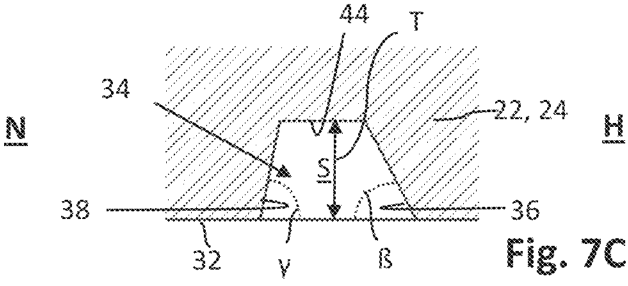

According to FIGS. 7B and 7C, the profile groove 34 may taper in the direction of its depth. The two lateral flanks 36, 38 can furthermore enclose different angles $\beta$, $\gamma$ with the running surface 32 of the sealing portion 24. According to FIG. 7B, the angle γ of the second lateral flank 38 is smaller than the angle β of the first lateral flank 36. According to FIG. 7C, the angle γ is larger than the angle β.

Figure 7D:
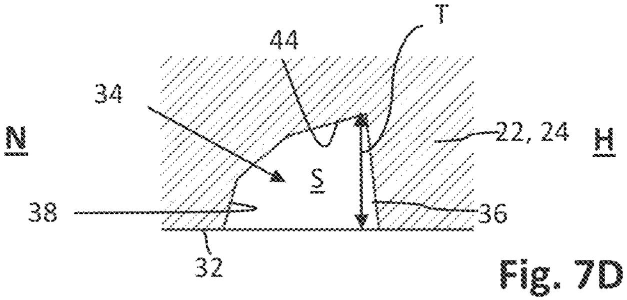

Some other polygonal, e.g. pentagonal, cross-sectional geometry of the profile groove 34 is also possible, as shown in FIG. 7D. Moreover, according to the exemplary embodiment 7D, one lateral flank 36, 38 or both lateral flanks 36, 38 of the profile groove 34 can be segmented, i.e., angled, as shown in the case of the second lateral flank 38.

Figure 7E:
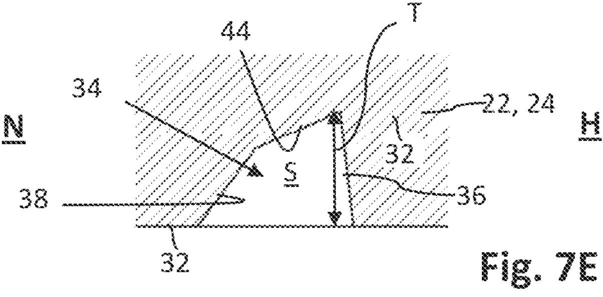

The bottom segment 44 of the profile groove 34 can be arranged so as to run obliquely to the running surface 32, e.g. in accordance with FIG. 7D and FIG. 7E.

Figure 7F:
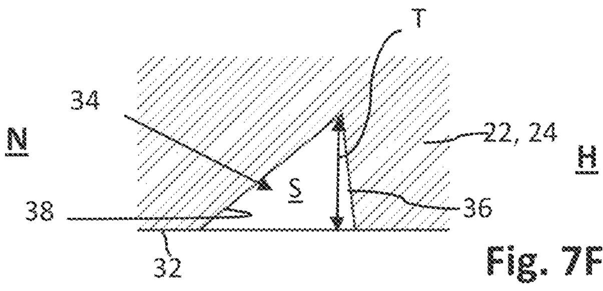

According to FIG. 7F, the profile groove 34 can also have a triangular cross-sectional geometry. In this case, a bottom segment 44 that can be delimited by the lateral flanks 36, 38 is omitted.

Figure 7G:
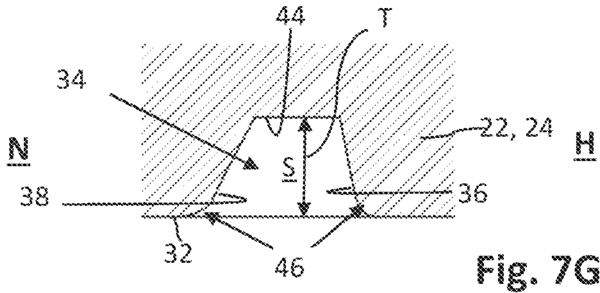
Figure 7H:
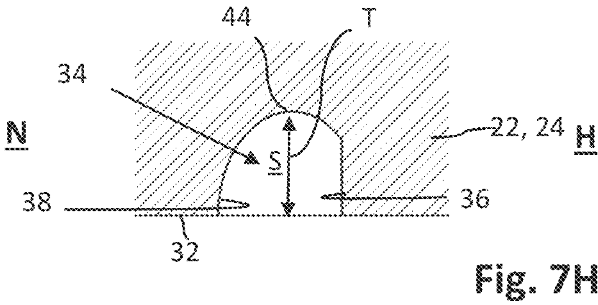

According to FIG. 7G, one or both lateral flanks 36, 38 can be least in sections curved and, if required, can form with the running surface a chamfer 46, which promotes entry of a lubricant into the profile groove 34. According to FIG. 7H, the bottom segment 44 can be curved and can merge steplessly into one of the two lateral flanks 36, 38.

Figure 7I:
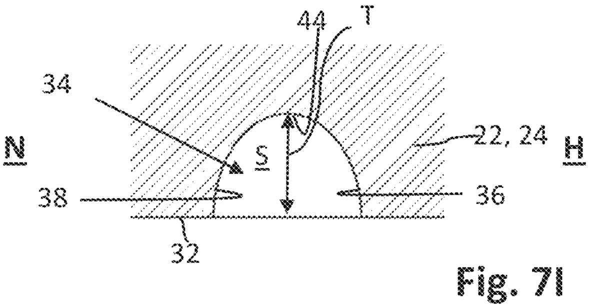
Figure 7J:
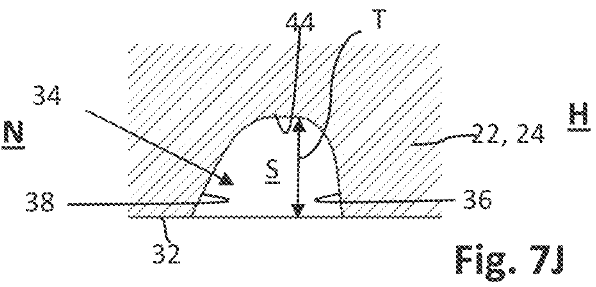

According to FIG. 7I, the profile groove 34 overall can have a rounded symmetrical geometry of its flow cross section or, according to FIG. 7J, it can have a rounded asymmetrical cross-sectional geometry.

Figure 8A:
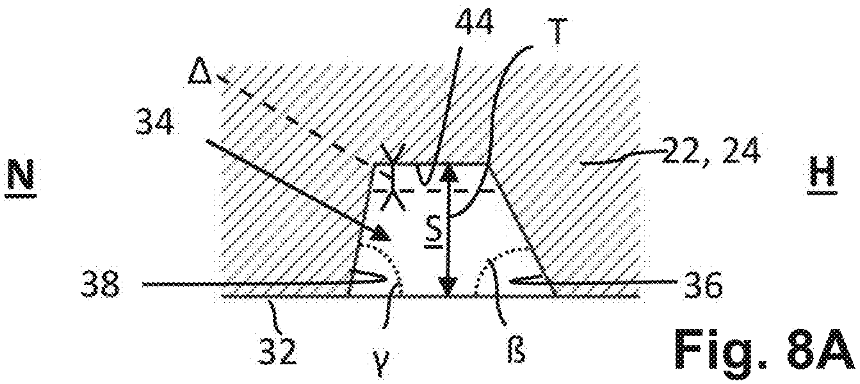
FIGS. 8A, 8B show profile grooves of a shaft sealing ring with a varying groove depth or with a varying flank course of their flow cross section.

As shown in FIG. 8A using the exemplary embodiment from FIG. 7C, the groove depth T of the bottom segment 44 can vary periodically by an amount Δ when viewed in the circumferential direction of the profile groove 34. Since the angle β of the high-pressure-side groove flank 36 is shallower than the angle γ of the low-pressure-side groove flank 38, the periodic variation Δ of the groove depth T of the bottom segment 44 leads to a return delivery effect in the direction of the high-pressure side H—especially also if the groove depth of the profile groove 34 remains constant in the circumferential direction.

Figure 8B:
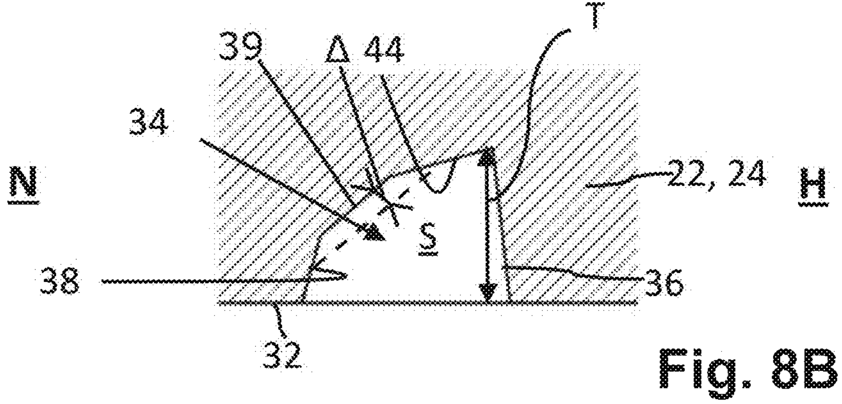

As shown in FIG. 8B using the exemplary embodiment from FIG. 7D, the flank course of a low-pressure-side groove flank 39 of the profile groove 34, which groove flank is directed toward the high-pressure side H or the high-pressure-side groove flank 36 and, in this case, is oblique, can vary periodically by an amount Δ when viewed in the circumferential direction of the profile groove 34. The periodic variation Δ of the flank course of the oblique low-pressure-side groove flank 39 leads to a return delivery effect in the direction of the high-pressure side H on account of the obliquity of the low-pressure-side profile groove 39 in the direction of the high-pressure side H—especially also if the groove width of the profile groove 34 remains constant in the circumferential direction. Instead of the oblique groove flank 39 in FIG. 8B, it is also possible for some other low-pressure-side groove flank that is directed toward the high-pressure side H or the high-pressure-side groove flank 36, e.g. the rounded low-pressure-side lateral flank 38 in the FIGS. 7H to 7J, to have a flank course which varies periodically by an amount Δ when viewed in the circumferential direction of the profile groove 34.

Figure 9:
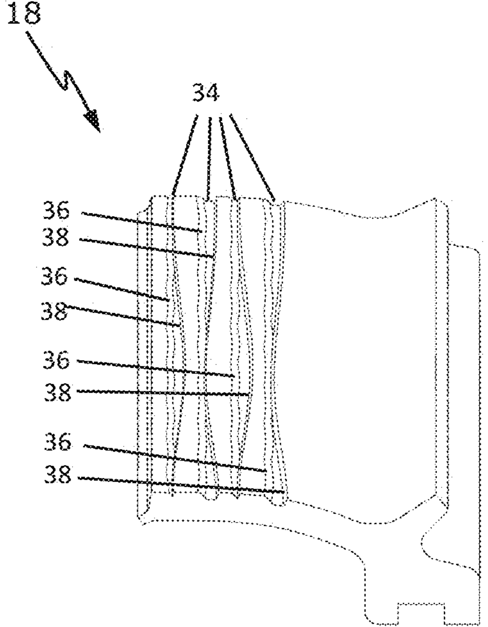
FIG. 9 shows another shaft sealing ring in a detail view.

Instead of being straight, as in FIGS. 2-6, the high-pressure-side first lateral flank 36 of the profile groove 34 can also be axially modulated when viewed in the circumferential direction of the profile groove 34. Thus, in FIG. 9, the first lateral flank 36 can be of undulating or sinusoidal design, specifically being periodic and of the same amplitude in the circumferential direction of the profile groove 34. Instead of being sinusoidal, the axial amplitude of the first lateral flank 36 can also be varied in any other manner desired. Thus, for example, there may be small “overshoots” in the amplitude, which lead intentionally to forced turbulence in the profile grooves 34. The maximum amplitude of the first lateral flank 36 is less than half the maximum amplitude of the second lateral flank 38 and is preferably less than one quarter of the maximum amplitude of the second lateral flank 38.

FIGS. 10A-10H show various variants of the first and/or second lateral flanks 36, 38, wherein the amplitude is plotted against the angle φ at the circumference of the shaft 12. The variants are various functions, which—in relation to the circumference of the shaft 12—are n-periodic, wherein n is a natural number.

FIG. 10A shows a sinusoidal course with a ½ period length (n=2).

FIG. 10B shows a sinusoidal course with a ⅕ period length (n=5).

FIG. 10C shows an aperiodic course, which is formed by the sum of the profiles shown in FIGS. 10A and 10B.

FIG. 10D shows an aperiodic course, which is formed by the difference between the profiles shown in FIGS. 10A and 10B.

FIG. 10E shows a periodic triangular course (n=6).

FIG. 10F shows a periodic sawtooth course (n=6).

FIG. 10G shows a periodic, symmetrical, arcuate course (n=3).

FIG. 10H shows a periodic, asymmetrical, arcuate course (n=4).

Particularly preferred embodiments of a profile groove 34 combine lateral flanks 36, 38 having the same period or those in which the period of one lateral flank 36, 38 is a multiple of the period of the other lateral flank 36, 38.

As many as possible minima 42 of the flow cross section of a profile groove 34 are preferably arranged in alignment with as many as possible maxima 40 of the respectively closest profile groove 34 over the circumference of the profile groove 34.

Different than shown in FIGS. 2-6, in which the maxima 40 and minima 42 of the flow cross sections of two adjacent profile grooves 34 are arranged axially in alignment, the minimum 42 of the flow cross section of a profile groove 34 to the closest maximum 40 of the flow cross section of the closest profile groove 34 can also be arranged offset in the circumferential direction, more specifically by at most half of the angular spacing between one minimum and an adjacent maximum of a profile groove 34, starting from the aligned arrangement. The offset makes it possible to influence the character of the return delivery effect. As a particular preference, the offset amounts to about ¼ of the angular spacing between a minimum and an adjacent maximum of a profile groove 34. An aligned arrangement of the minimum 42 of the flow cross section of a profile groove 34 with the closest maximum 40 of the closest profile groove 34 corresponds to an angular offset op of 0°. In FIG. 11, the minimum 42 of the flow cross section of a profile groove 34 has an angular offset op of 90° from the closest maximum 40 of the flow cross section of the closest profile groove 34, which corresponds to half the angular spacing between a minimum 42 and an adjacent maximum 40 of the profile groove 34.

Figure 12A:
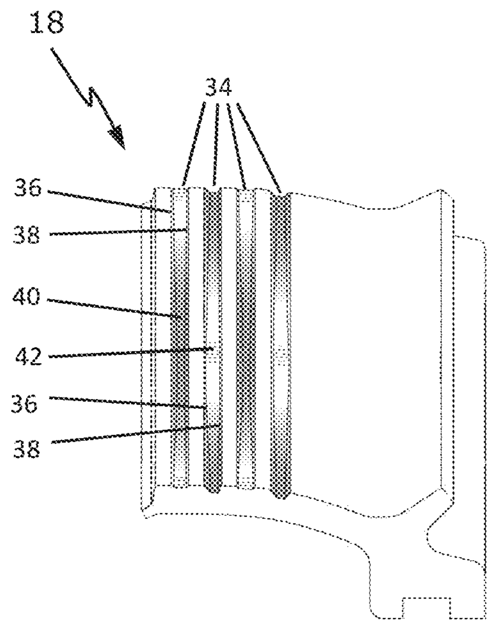
FIGS. 12A, 12B show further shaft sealing rings in a detail view.
Figure 12B:
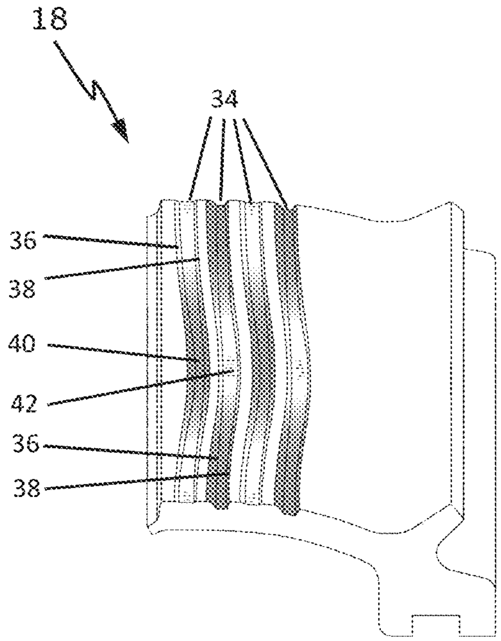

The embodiments shown in FIGS. 12A, 12B differ from FIGS. 2-6 in that here the profile grooves 34 run next to one another in a straight line and parallel (FIG. 12A) and in an undulating and parallel manner (FIG. 12B). When viewed in the circumferential direction of the profile grooves 34, the groove depth of the profile grooves 34 has respective periodically alternating valleys, i.e., maxima 40 of the flow cross section of the profile groove 34, and hills, i.e., minima 42 of the flow cross section of the profile groove 34. This periodic or alternatively aperiodic variation of the groove depth T leads to a return delivery effect in the direction of the high-pressure side H on account of a shallower high-pressure-side groove flank (as in FIG. 8A) and/or on account of an obliquity of the low-pressure-side groove flank in the direction of the high-pressure side (as in FIG. 8B)—especially also if the groove width of the profile groove 34 remains constant in the circumferential direction.

What is claimed is:

1. A shaft sealing ring for sealing off a media side from an outer side of a shaft arrangement, comprising:

a sealing portion, which, in the operating state, extends along a sealing axis, and which has a running surface for dynamic sealing contact with a sealing surface of a machine part of the shaft arrangement;

wherein the sealing portion is provided with a plurality of profile grooves, which are arranged spaced apart in the direction of the sealing axis and are each open toward the running surface;

wherein each profile groove is laterally delimited by a first lateral flank, which is arranged on the media side during operational use of the shaft sealing ring, and by a second lateral flank, which is arranged on the outer side during operational use;

wherein:

(a) the first lateral flank has a straight or substantially straight course in the circumferential direction, the second lateral flank extends bidirectionally in the circumferential direction of the shaft sealing ring axially towards the first lateral flank from each maximum of a flow cross section of the profile groove to a minimum of the flow cross section, and each minimum of a profile groove is arranged in alignment or substantially in alignment with a maximum of the respectively closest profile groove; or (b) the groove depth of the profile groove varies in the circumferential direction of the profile groove in order to form alternate maxima and minima of the flow cross section in the profile groove, and each minimum of a profile groove is arranged in alignment or substantially in alignment with a maximum of the respectively closest profile groove; or (c) at least some of the profile grooves or each profile groove are/is in the form of a closed ring, the flank course of a groove flank of the profile groove varies in the circumferential direction of the profile groove in order to form alternate maxima and minima of the flow cross section in the profile groove, and each minimum of a profile groove is arranged in alignment or substantially in alignment with a maximum of the respectively closest profile groove.

2. The shaft sealing ring as claimed in claim 1, wherein in the variant (a) or (b), at least some of the profile grooves or each profile groove are/is in the form of a closed ring.

3. The shaft sealing ring as claimed in claim 1, wherein in the variant (a) or (b), at least some of the profile grooves are completely interrupted in the circumferential direction.

4. The shaft sealing ring as claimed in claim 1, wherein the maximum of the flow cross section is at least twice as great as the minimum of the flow cross section.

5. The shaft sealing ring as claimed in claim 1, wherein, on both sides of each maximum of the flow cross section of each profile groove or of some of the profile grooves, the second lateral flank extends in the circumferential direction in a straight line or in a convexly curved or concavely curved manner axially towards the first lateral flank to the respective minimum.

6. The shaft sealing ring as claimed in claim 1, wherein at least some of the profile grooves or each profile groove have/has a rounded or a polygonal geometry of its flow cross section.

7. The shaft sealing ring as claimed in claim 1, wherein the first and/or the second lateral flank have/has at least in sections different flank gradients in relation to the sealing axis of the shaft sealing ring.

8. The shaft sealing ring as claimed in claim 1, wherein the media-side lateral flank and the outer-side lateral flank of at least some of the profile grooves or of all the profile grooves converge toward the sealing axis in a radial direction.

9. The shaft sealing ring as claimed in claim 1, wherein at least some of the profile grooves or all the profile grooves have a radial depth which varies in the circumferential direction of the shaft sealing ring, in particular which is greater at each maximum of the flow cross section than at a minimum of the flow cross section of the respective profile groove.

10. The shaft sealing ring as claimed in claim 1, wherein a running surface segment arranged between a maximum of a profile groove and the minimum of the respectively closest profile groove can be deformed in a radial and/or axial direction relative to the rest of the shaft sealing ring by actuating by the medium in order to simplify axially directed reverse transport of the medium from one profile groove to the closest profile groove during the operational use of the shaft sealing ring.

11. The shaft sealing ring as claimed in claim 1, wherein the sealing portion is formed by a sealing lip of the shaft sealing ring.

12. The shaft sealing ring as claimed in claim 1, wherein the shaft sealing ring at least in sections comprises or consists of a polymer material that is tough-elastic or rubber-elastic in deformation.

13. The shaft sealing ring as claimed in claim 1, wherein the shaft sealing ring is a radial shaft sealing ring.

14. The shaft sealing ring as claimed in claim 1, wherein the substantially straight course of the first lateral flank includes an axial modulation in the circumferential direction, the maximum amplitude of which is less than half the maximum amplitude of the second lateral flank.

15. The shaft sealing ring as claimed in claim 1, wherein the substantially aligned arrangement of a minimum of a profile groove with a maximum of the respectively closest profile groove includes an offset in the circumferential direction of at most half of the angular spacing between a minimum and an adjacent maximum of a profile groove.

16. The shaft sealing ring as claimed in claim 1, wherein, in the case where the groove depth of the profile groove or the flank course of a groove flank of the profile groove varies periodically in the circumferential direction of the profile groove in order to form alternate maxima and minima of the flow cross section in the profile groove, the profile grooves run in a straight line and parallel next to one another or run in an undulating manner and parallel next to one another.

17. The shaft arrangement comprising a first machine part in the form of a shaft and a second machine part surrounding the shaft, which are arranged spaced apart, forming a sealing gap, and can be adjusted relative to one another around an axis of rotation, and the shaft sealing ring for sealing off the media side of the sealing gap from the outer side of the sealing gap, wherein the shaft sealing ring is designed in accordance with claim 1 and rests by means of its sealing portion on the sealing surface of the second machine part with a dynamic sealing effect.

* * * * *